July 20, 1937.  A. AMES, JR., ET AL  2,087,235
METHOD OF CORRECTING OCULAR ERRORS
Filed May 27, 1935    3 Sheets-Sheet 1
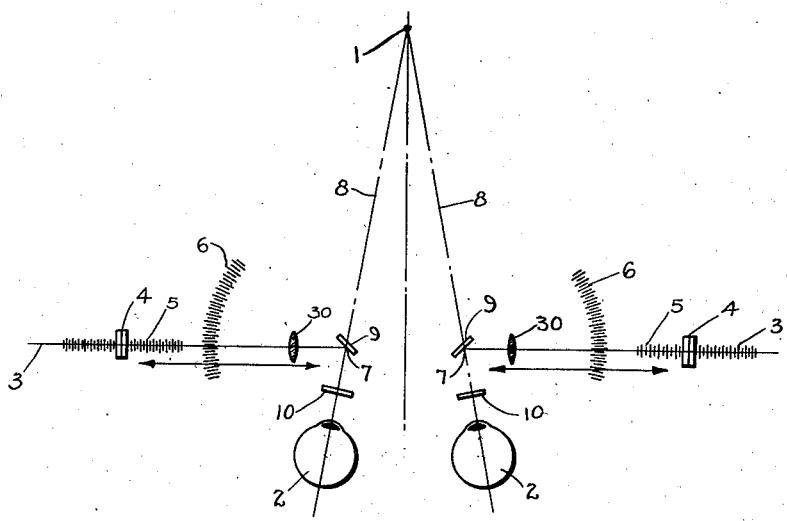
FIG. I
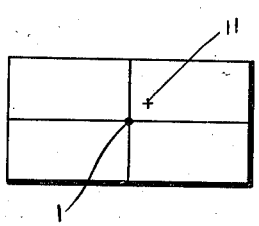
FIG. II
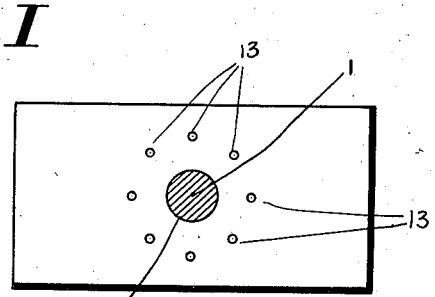
FIG. III
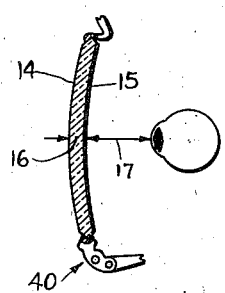
FIG. IV
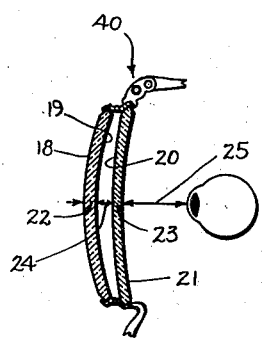
FIG. V
INVENTOR
ADELBERT AMES JR.
GORDON H. GLIDDON
BY
Harry H. Styll
ATTORNEY July 20, 1937.  A. AMES, JR., ET AL  2,087,235
METHOD OF CORRECTING OCULAR ERRORS
Filed May 27, 1935  3 Sheets-Sheet 2
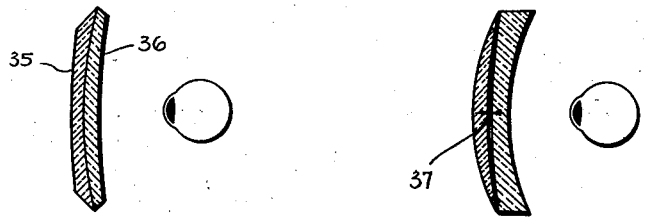
FIG. VI  FIG. VII
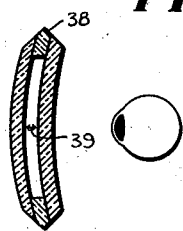
FIG. VIII
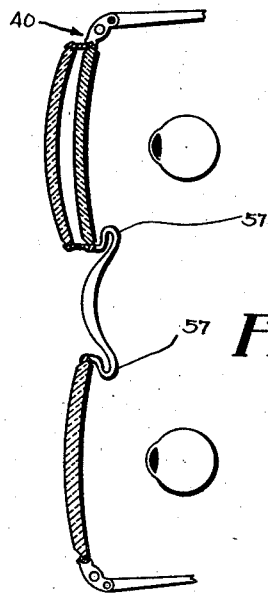
FIG. IX
INVENTOR
ADELBERT AMES JR.
GORDON H. GLIDDON
BY
Harry H. Styll
ATTORNEY July 20, 1937.    A. AMES, JR., ET AL    2,087,235
METHOD OF CORRECTING OCULAR ERRORS
Filed May 27, 1935    3 Sheets-Sheet 3
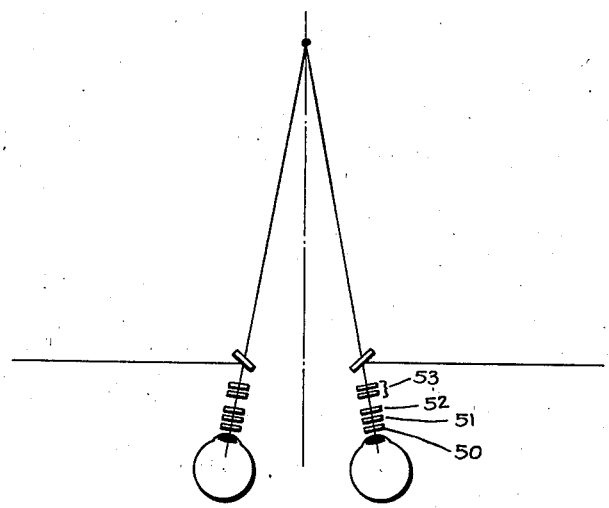
FIG. X
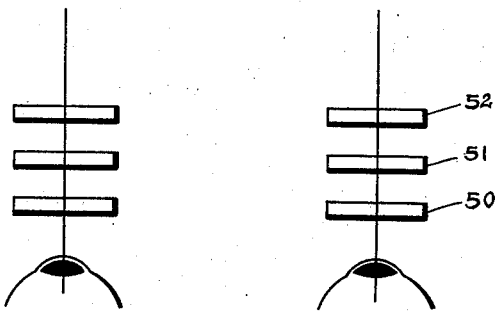
FIG. XI
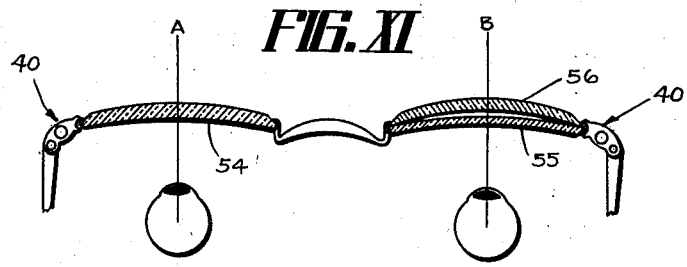
FIG. XII
INVENTOR
ADELBERT AMES JR.
GORDON H. GLIDDON
BY
*Harry H. Styll*
ATTORNEY Patented July 20, 1937

2,087,235

UNITED STATES PATENT OFFICE 2,087,235

METHOD OF CORRECTING OCULAR ERRORS

Adelbert Ames, Jr., and Gordon H. Gliddon, Hanover, N. H., assignors to trustees of Dartmouth College, Hanover, N. H., a corporation of New Hampshire Application May 27, 1935, Serial No. 23,694

3 Claims. (Cl. 88—20)

This invention relates to a method and/or process for equalization of the actual visual impressions or ocular images of the eyes for size and shape, either with or without the correction of all or some of the other refractive errors of the eyes including errors of focus, astigmatism, and muscle disturbances.

As herein used the terms "actual visual impression" or "ocular image" describe the impression formed in the higher brain centers during vision. It is determined not only by the properties of the dioptric image that is formed on the retina of the eye, but also by the modifications imposed upon it by the anatomical properties and physiological processes by which this optical image is carried to the higher brain centers.

One of the principal objects of the invention is to provide a new method and/or process of ascertaining a balanced refraction (that is correction with any kind of optical lens) of the eyes, including equalization of actual visual impressions of size and shape or ocular images, together with the determination, production and fitting of lens means to correct the ascertained errors from said refraction.

Other objects of the invention are: to provide new processes of refraction for the errors of focus, astigmatism, and muscle disturbances; to provide new processes of ascertaining and measuring the difference of the actual visual impressions or ocular images of the two eyes for size and shape; to provide new processes for balancing the refraction of the eyes including all the refractive elements involved so that the final determination will be a composite correction including all the elements whereby a complete correction is provided; to provide new processes for calculating and designing lens means to correct the ascertained errors; to provide new processes for making the said lenses; and to provide new processes for fitting and holding the said lens means before the eyes.

Another object is the provision of new processes for making the said refractive correction both for far and near vision, both in trial lenses and in actual prescription lenses to be worn.

Another object is the provision of a new clinical method or technique designed to ascertain and correct the refractive errors of the eyes, including the equalization of actual visual impressions of size and shape both for far and near vision.

Other objects and advantages will become apparent from the following description taken in connection with the accompanying drawings, and it will be apparent that many changes can be made in the details and order of the steps of the process without departing from the spirit of the invention as expressed in the accompanying claims. It is, therefore, not wished to limit the invention to the exact details and order of the steps of the process as described and shown, as a preferred arrangement and order has been shown and described by way of illustration only.

Referring to the drawings:

Figure I is a diagrammatic view showing the refractive means employed in the process;

Figure II is an elevation of one form of test chart used in the refraction;

Figure III is an elevation of another form of test chart used in the refraction;

Figure IV is a cross section of a one piece size and shape lens;

Figure V is a cross section showing a two part size and shape lens and means for holding it in place before the eye;

Figure VI is a cross section of a two part size and shape lens fitted together on the inner surfaces of the two parts;

Figure VII is a cross section of a two part size and shape lens fitted together at the edges of the two parts with a space between them;

Figure VIII is a cross section of a two part size and shape lens having the two parts separated and held together by a marginal filler piece;

Figure IX is a plan view of a pair of spectacles including the invention, the lenses being shown in cross section;

Figure X is a diagrammatic plan view of the testing means showing the cells for the trial or test lenses;

Figure XI is a diagrammatic plan view of the test lens cells shown in relation to the eyes; and Figure XII is a plan view of a spectacle frame including the prescription lenses shown in cross section in relation to the eyes.

We have discovered in our research work, and particularly our research work that we are carrying on in the Department of Research in Physiological Optics, of the Medical School of Dartmouth College, Hanover, New Hampshire, that there is a large number of people who fail to receive relief from the refractive correction of the eyes for errors of focus, astigmatism, and muscle disturbances, as practised up to this time. Our research has led us to the discovery that in addition to the retractive errors of focus, astigmatism, and muscle disturbances, which were all of the refractive errors corrected up to this time, there may be also a difference in the ocular images or actual size and shape impressions of the eyes which may amount to a serious defect as regards the patients' vision, health, and comfort. Up to this time this defect, as far as we know, was not known and appreciated, and as a consequence, the patient was without corrective relief therefor.

Up to the present time, as far as we know, the only errors of refraction measured and corrected were those of focus including astigmatism, and muscle disturbances. Some one or all of these errors might be present in a single individual. These corrections were prior art and well known. Simple focus error was corrected by a spherical lens, astigmatism by a cylindrical or toric lens, and muscle trouble by a prismatic lens or decentration. Where a patient had all three errors, the spherical surface was placed on one side of the lens, the cylindrical or toric surface on the other, and the prism usually inserted by the decentration of the lens.

Ocular size image differences as influencing binocular vision are functions of pure magnification apart from change of focal distances. It therefore becomes necessary to insert a new element in the lens combination, namely, a magnification that will not disturb the focal powers. This problem led to the invention of new forms of refractive lenses, and lens systems, based upon the invention and development of new methods of refracting the eyes and balancing all the disturbances, including that of the said ocular image differences.

The effects of this size and shape difference was so serious in a large number of cases examined in our research that it became evident that for the general good of mankind, a new technique and/or process of correcting the eyes, including new refractions, new instruments, new testing processes, new test lenses, new lenses, and a new fitting technique, would have to be invented and developed.

We have now invented, developed, perfected, and established a clinical method for correcting patients having these defects. We have made important inventions in instruments, test lenses, and prescription lenses as a part of our research, but our most important contribution has been our process of determining and correcting these defects as set forth herein, and which has entailed the invention of an entirely new technique and procedure from start to finish, establishing an entirely new art in the field of refractive eye correction.

We have discovered in our research that a very small difference in size and/or shape of the ocular images is productive of serious injury to the patient. A very large percentage of all the cases we have examined is below 5 per cent in size difference. As a consequence, processes of measurement of minute accuracy had to be invented. Mere approximations are not satisfactory for a true relief of the patient. This necessitated the invention and development of the most accurate testing processes, devices, and instruments.

Prior to our investigation, no one, as far as we know, ever refracted and measured the difference of ocular images or actual visual impressions of size and shape of the eyes with a view to their equalization in order to correct vision. Further, no one, as far as we know, heretofore balanced the refraction of focus, astigmatism, and muscle disturbances with that of the equalization of the ocular images or actual size and shape impressions. It is likewise new to introduce into lenses for the correction of refractive errors the element of change of magnification without change of power based on the shape, i. e., cupping or bulging of the lenses, namely, the change of the bulge shape of a lens without changing its power, in combination with the magnification due to power.

In describing our invention, probably the best and clearest procedure will be to follow the patient from his entrance into a clinic equipped to make the necessary tests until his complete refraction is made, and his correction fitted before his eyes.

The patient before arriving at the clinic may have had the usual prior art refraction for focus, astigmatism and muscle disturbances made by the refracting practitioner. He may also have had the usual pathological examination made covering his general health, and a regular medical examination of the fundus of the eyes by use of the retinoscope and ophthalmoscope, etc.

When the patient comes to us we first refer him to a medical practitioner for the usual pathological examination. The report of this examination is brought to us and studied carefully.

We now question the patient from a symptom chart we have prepared, and fill in the chart from his medical report and his answers.

Next the patient is subjected to an exact clinical refraction test. According to our new testing method, we test each eye separately for monocular vision, while both eyes are fixed for single binocular vision, and we investigate dioptric or focus errors, including astigmatism, muscle disturbance, and ocular image variances concomitantly and under close correlation of the various component test phases, observing and measuring the influence and changes which the presence and/or correction of each defect effects upon the degree and correction of other defects.

In our refraction test for focus, astigmatism, muscle disturbances, and conscious size and shape variance, we use an instrument of the kind shown in U. S. Patents 1,944,871 and 1,946,925 and which is diagrammatically represented in Fig. I hereof. The patient's head is first accurately placed in the head rest of the instrument so that his eyes are accurately located and held at a predetermined position in relation to the instrument and test devices. The distance between the eyes and the various testing appliances being very important factors, the instrument is designed for exact adjustment and preservation of such distances, and all functions of the instrument are based on the position of the eye relatively to the instrument.

The instrument comprises in the preferred embodiment, a test chart of the type of that shown in Fig. II or Fig. III of the drawings. The center of fixation I of these charts as the case may be, is placed at the point I of Fig. I. The eyes are fixed as indicated at 2 in Fig. I, and trained to bear on the point I of the chart. This gives the point I as a single fixation point of both eyes. There are pivoted cross arms 3. On the cross arms 3 are the slide test objects 4 usually provided with illumination. These objects slide back and forth on the arms 3, the movement being measured by the scale 5. The rotative movement of the arms 3 may be measured on the scale 6. At the point 7 where the lines of sight 8 cross the arms 3, are provided transparent mirrors 9, through which the point I may be seen by each eye, and in which the reflection of test object 4 for each respective eye is reflected. The instrument as arranged in Fig. I is for the distance test. To test for near, the whole instrument is rotated about the center of the eyes so the eyes may look directly at a near chart, if desired downwardly, for example at an angle of about 20°, and the arms 3 are rotated to converge for each eye on the reading chart, in that position. The distance chart is usually 20 feet and the reading chart 16 inches from the eyes.

There are cells 10 before each eye for holding test lenses to be used in the test.

Lenses 30 are located on the arms 3 as and for a purpose hereinafter described.

Tests involving the dioptric function of the eyes are made by finding points conjugate to the retinas while the eyes have binocular fixation at the distance for which they are being used, usually for two distances, one for a moderately distant test object and the other for a reading distance test object.

To test for phoria or muscle disturbance, the patient is placed with his eyes in the proper location in the instrument, Fig. I. Test chart Fig. II is placed at the required distance with the point 1 located as in Fig. I. An illuminated preferably monochromatic dot target is placed in slide 4. The eyes are first fused on the object 1, then one eye is blanked off. This produces a test for phoria, termed disassociated phoria test. The eye which has not been blanked off sees the image of the dot displaced from the point 1, as shown at 11, Fig. II, if there is phoria. The amount of displacement and therefore the phoria can then be determined in various ways, for example, by moving the point mechanically or optically, or by reading its displacement on the chart according to Fig. II. The muscular disturbances evaluated during this phase of the test may be compensated for by elements involving prism lenses, or by decentration of lenses.

To test for dioptric defects, the patient, always remaining placed in the instrument (Fig. I) with his eyes located in the correct relative position, looks at a test chart (Fig. III) placed in front of the eyes at the proper distance so that the center point 1 of the chart is at 1 in Fig. I. A dot test device is placed in the slide 4. In this case spherical lenses 30 may be located on the arms 3 so that the rays emerging from the lens on the eye side may be made to converge or diverge and the degree of convergence or divergence read on the scale attached to 4.

Test lenses, spheres or cylinders, may be placed in the cell 10 to make the fixation point 1 clear and distinct. Then the slide 4 is moved on the arm 3 to focus the monochromatic dot on the chart. The focus is measured by the power of the lens in cell 10 and the movement of the slide 4 on arm 3, or if no lenses are in the cells 10, by the movement of the slide 4 alone. The focus is determined by the power or movement required to render the dot smallest and sharpest. In this test it will be understood that both eyes are fixed on point 1, and the one eye under test only sees the dot in relation to its location as respects the point 1. This means that the one eye is tested monocularly while both eyes are fixed in single fixation.

To test for astigmatism, the patient's eyes are fixed with relation to the instrument, Fig. I. Chart, Fig. III, is used as before as fixation object. In the slide 4 is a test object comprising for example, three dots in line. There may or may not be cylinder lenses in the cells 10. The slide 4 is moved until the dots appear as sharply defined lines on the point 1 of the chart. The object in the slide 4 is then rotated 90 degrees and the slide 4 moved until the lines are sharply focused again. The difference in the readings on the arm 3 is the amount of astigmatism, and is known as the interval of Sturm. The amount of astigmatism is read off on the scale on arm 3. The axis or meridian of the astigmatism is shown by the rotation of the three dot object on slide 4. This gives the astigmatism and its axis. The test is also made monocularly with single binocular fixation.

All of these refractive tests are for determining the prior art refractions for dioptric defects including astigmatism and muscle disturbances, made in a new manner permitting evaluation and correlation of these defects in relation with one another and with the size test phase now to be discussed.

The method of operation and procedure for these component tests is fully described in the two United States Patents referred to above.

Also, it is clear that the test may be made for far and near vision by using the targets at their respective distances, and tilting and converging the instrument for near vision.

This novel test procedure for near vision insures testing the eyes under actual reading conditions, through the center of the lenses.

The next step is to introduce the proper test lenses in the cells 10 to balance the refraction of the two eyes. They are balanced three or four times, right to left, left to right, checking and re-checking, to assure the proper balance for the eyes as tested to that point.

Then the test is made for ocular image size and shape variations of the eyes. The test is made for both far and near, as before.

In a preferred embodiment, the target, Fig. III, is used, being placed at 1 in Fig. I. This target has a shaded circle 12 in the center, and marginal holes 13. Behind the holes 13 are placed lights at such angles that one eye will see the holes as black dots, and the other eye as illuminated dots. Other means may be employed to make a distinction between the dots. If the eye has no size or shape difference, the lights and spots will coincide. If there is a difference, the lights and spots will be separated. Size and shape test lenses are placed in the cell 10 until the dots and lights coincide, and the magnitude of these lenses noted. This is an entirely new test with us. The variance of optical images can thus be made conscious and measurable, according to a novel method originating with us.

If the patient reports no size difference in the test, but his symptoms from the symptom chart are indicative of a size difference, he is checked to see if he is hiding a size and shape difference. This is done by putting over all or meridional size test lenses, as the case may be, in the cell 10, so that the ocular image of one eye increases, then do the same with the other eye. This will bring out the hidden size difference. Then he is corrected by means of a magnitude that is the average of the test for the two eyes.

These tests result in a trial correction of test lenses in the various cells before the eyes, see Fig. X. These test cells are placed at a known distance from the eyes. Cell number 1, indicated at 50, is for the spherical power lenses. Cell number 2, indicated at 51, is for the cylindrical power lenses. Cell number 3, indicated at 52, is for an additional power cylinder for exactly determining astigmatism or for extra power lenses, and cells number 4, indicated at 53, are for the size test lenses. This trial correction, if it checks accurately, is the patient's required prescription, and the actual prescription lenses must be the equivalent of them.

The size and shape correction must be rechecked with the dioptric and muscular correction, as size and shape changes may influence the latter, and vice versa. All correction components are balanced until the patient has a satisfactory resultant correction for all the errors.

This trial correction of test lenses is shown in Fig. XI, where 50 is the spherical power, 51 the cylinder power, and 52 the size correction. These are shown in relation to the eyes. The distance from the eyes of the test lenses and of the actual prescription lenses is of the first importance, as will be shown hereafter.

It will be noted here that the power lenses placed before the eye for dioptric correction will change the magnification. Change in power introduces a change in magnification. Also, magnification lenses used at any other distance than the required one may have power. These powers and magnifications have to be accurately balanced so that the test lens system will give the correct power for both eyes and balance the size difference. Change in distance from the eyes will also change the characteristics of the lenses, and that has to be taken into account and compensated also.

We have now made the test and placed the test correction before the eyes.

Having now completed and balanced the entire refraction, including size and shape variance, the readings are taken from the test and the prescription written. Here we are faced with the necessity of an entirely new procedure because there is a new factor of size magnification added. It is now necessary to take the readings and calculate and design a new lens system for the prescription. This embraces the curvatures of the surfaces, thicknesses, separations, and distance from the eye. The lens has to be designed to fit the conditions. The difficulty lies in the fact that a change of magnification has to be introduced into the refractive lens without changing its focus or power. Such lenses in some instances may be designed of one piece of glass, while in other instances multiple units, one before the other, may have to be used. In our lenses we introduce a part of the magnification required by altering the bulge or cup shape of the lens and its thicknesses and position before the eye without changing its power. The elements of such lenses are the curvature of the respective surfaces, the thickness, the separation, and the distance from the eye. Such lenses are shown and described in United States Patent No. 1,933,578, and they are entirely new refractive lenses used for an entirely new refractive correction of the eyes.

The magnification may be changed by the separations, thicknesses and distance from the eye, so we must be careful to equate the total magnification so that the result will produce the required equalization and be equivalent to the test correction system of lenses. It must be noted here that the magnification of each eye does not have to equal the magnification of the test lenses used for each eye but the ratio between the prescription lenses for the two eyes must be equal to that of the test lenses for each meridian.

In Fig. IV we have shown a one piece lens, the important factors for our consideration being the curvatures 14 and 15 of the surfaces, the thickness 16, and the distance 17 from the eye.

The lens of Fig. IV may be made as follows:

The power is determined by the relationship of the surface curvatures 14 and 15. In this form the magnification is a resultant of the bulge shape, of the relationship of the bulges or cupping of the surfaces 14 and 15, the thickness 16, and the distance from the eye 17.

In Fig. V we have shown a two part lens, the factors of which are the curvatures of the surfaces 18, 19, 20 and 21, the thicknesses 22 and 23, the separation 24, and the distance 25 from the eye. Magnification is introduced again by the bulge or shape function, but the distance from the eye, thicknesses, and separation have to be carefully calculated and maintained to give the required amount of magnification and dioptric power.

These considerations of magnification also hold true for lenses of the type shown in Figs. VI, VII, and VIII. The effective magnification is the resultant or composite magnification of the lens system, and its position in front of the eye.

The distance at which the lens is placed before the eye changes its optical effect. If this distance is different from that of the test lens, it will be necessary to calculate the compensation that will have to be made.

In Fig. VI there is shown a size and power lens made in two pieces and fitted together on their inner surfaces. Such a lens is usually used where the surfaces 35 and 36 are both toric. Such a structure provides means by which the axes of the two toric surfaces may be accurately aligned, a very difficult matter in a one piece lens.

Fig. VII shows a two part size and power lens fitted on the marginal edges and having an air space 37 between the two pieces.

Fig. VIII shows a two part size and power lens with a filler piece 38 and an air space 39 between the two pieces.

The surfaces of the lenses are the usual refractive lens surfaces, spherical, cylindrical, toric, aspherical, etc. The lens medium is the usual refractive glass lens medium, and the surfaces are produced by regular prior art methods well known in the art.

The lenses, of course, are designed and made to correct the refractive errors of focus, astigmatism, muscle disturbance, in combination with the size and shape corrections. If there is only size and shape variance, correction for that alone is made in the lenses.

The size and shape variance may be corrected by increasing the ocular image of the eye having the smaller image, decreasing the ocular image of the eye having the larger image, or by adjusting the ratio of the images of the two eyes.

In Fig. XII we have shown a spectacle containing the actual prescription lenses in place before the eyes. As stated, these lenses are designed from the trial set corrections shown in Fig. XI, and are optically a sufficiently exact equivalent of the trial correction.

Magnification of known lenses may be calculated by prior art methods of calculation known to lens designers. We have made calculations of a large number of power and size lenses covering the required range, basing our calculations on the distance from the eye, the thicknesses and separation of the units, the shape or bulge, and the curvatures for a medium that is the regular medium in the manufacture of ophthalmic lenses.

In doing this we have to take into consideration that while lens A, Fig. XII, has the same power as the test lenses for that eye, it may have a different magnification. Also, the same thing for the eye B. Then, in eye B we must first compensate for the magnification in eye A, and to this add another magnification sufficient to equalize the size difference between the two eyes, and the final magnification ratio of A to B must be the exact magnification ratio of the two eyes of the trial correction. The magnification of A depends on the distance from the eye, its thickness, and the curvatures of its two surfaces. The magnification of B is a function of its distance from the eye, the thicknesses of its parts, their separation, and the curvatures of its surfaces, and as stated, the magnifications A and B must compensate the magnifications due to power and add enough magnification to equalize the size difference between the two ocular images. A portion of the magnification of the lenses is usually supplied as shape or bulge magnification, as stated above.

It will be noted that in lens B the two units contact each other adjacent their margins. This bending or cupping and this contact gives us a lens that is light of weight, shapely, and not too bulky or clumsy for wearing before the eyes.

The spectacles of Fig. XII comprise a single lens unit 54 for the A eye, and two lens units, 55 and 56, for the B eye. A lens system of this type can be made with sufficient exactness and equivalent of the test set of Fig. XI, correcting both the power and size errors of the patient.

The lenses when made are mounted in a frame and fitted before the eye. As the distance from the eye and the separations, are of first importance, they must be accurately mounted in the frame with the proper separation, and then the frame must be accurately fitted to place the lenses at the proper distance from the eyes.

Every step of this process must be taken with care and accuracy—the refraction, the designing of the lenses, the making of the lenses, the mounting of the lenses, and the fitting of the lenses before the eyes.

The frame and temple are indicated at 40 in the various figures. The frame as shown in Fig. IX is made with means 57 by which it may be adjusted to position the lens before the eye at the required distance. This fitting of the lenses before the eye is of the first importance as the magnification is affected by the distance from the eye.

Our lenses offer great facility in adjusting them for the required magnification. In the case of a one piece lens, the magnification can be altered and changed by changing the distance from the eye. In a two part lens both the separation and the distance from the eye may be changed, hence, there are two elements that may be changed to adjust the magnification as required. This provides an important facility and means of adjustment and rectification.

From the foregoing it will be seen that we have invented an entirely novel process and technique for equalizing ocular images or actual size and shape impressions of vision, including a new process of refraction, a new process of designing and making refractive lenses adapted to produce the required result, and a new process of mounting, positioning, and fitting the lenses before the eyes to accomplish the required result.

Having described our invention, we claim:

1. The process of equalizing the size and shape image impressions of the two eyes comprising forming in the respective eyes images of test target means which have elements indicating dimensional properties of said target means and whose relative positions may be compared, superimposing the conscious appearance of the corresponding ocular images of said target means for comparison thereof in binocular vision, changing the relative size and shape of said images until they assume a predetermined positional relation with each other, determining the amount of said change to obtain the ratio of difference in the size and shape of the images of the two eyes, making a lens system for one eye by forming optical surfaces of computed curvatures on lens medium according to the distance that the lens system is to be worn before the eye to correct the ocular errors of said eye, making a lens system for the other eye by forming surfaces on lens medium to specified spaced relation with each other and to computed curvatures which are so cupped and related to each other for a given distance at which the said system is to be worn before the eye to correct the ocular errors of said eye and introduce a size and shape of image correction equal to the size and shape change introduced by the first lens system plus the ratio of difference between the size and shape of the images of the two eyes with substantially no change in the focal power correction values of the lens systems and securing said lens systems in a mounting in place before the respective eyes at the required distance therefrom as determined by the computations of each respective lens system.

2. The process of equalizing the size and shape image impressions of the two eyes comprising forming in the respective eyes images of test target means which have elements indicating dimensional properties of said target means and whose relative positions may be compared, superimposing the conscious appearance of the corresponding ocular images of said target means for comparison thereof in binocular vision, changing the relative size and shape of said images until they assume a predetermined positional relation with each other, determining the amount of said change to obtain the ratio of difference in the size and shape of the images of the two eyes, making a lens system for one eye by forming optical surfaces of computed curvatures on lens medium according to the distance that the lens system is to be worn before the eye to correct the ocular errors of said eye, making a lens system for the other eye by forming surfaces on lens medium to specified relation with each other and to computed curvatures which are so cupped and related to each other for a given distance at which the said system is to be worn before the eye to correct the ocular errors of said eye and introduce a size and shape of image correction equal to the size and shape change introduced by the first lens system plus the ratio of difference between the size and shape of the images of the two eyes with substantially no change in the focal power correction values of the lens systems, securing said lens systems in a mounting positioned before each eye and adjusting the said mounting to place the lens systems at their required distances from their respective eyes as determined by the computations of each respective lens.

3. The process of equalizing size and shape image impressions of the two eyes comprising correlating the ocular images of a person by presenting to each eye a test object means with elements for dimensional comparison, relating the conscious appearance of the ocular images of said test object means for comparison thereof, adjusting the relative dimension of said test object means as appearing through the eyes while substantially maintaining the distance of the respective images from the eyes to obtain a dimensional relation of said ocular images, measuring said adjustment to obtain the ratio of difference in the size and shape of the images of the two eyes, making a lens system for one eye by forming optical surfaces of computed curvatures on lens medium according to the distance that the lens system is to be worn before the eye to correct the ocular errors of said eye, making a lens system for the other eye by forming surfaces on lens medium to specified spaced relation with each other and to computed curvatures which are so cupped and related to each other for a given distance at which the said system is to be worn before the eye to correct the ocular errors of said eye and introduce a size and shape of image correction equal to the size and shape change introduced by the first lens system plus the ratio of difference between the size and shape of the images of the two eyes with substantially no change in the focal power correction values of the lens systems and securing said lens systems in a mounting in place before the respective eyes at the required distance therefrom as determined by the computations of each respective lens system.

ADELBERT AMES, Jr.
GORDON H. GLIDDON.